I. HENNE AND J. L. PREO.
MACHINE FOR BORING AND DRILLING.
APPLICATION FILED MAY 28, 1920.

1,369,656.

Patented Feb. 22, 1921.

INVENTORS
Isabelle Henne
BY John L. Preo

ATTORNEY

I. HENNE AND J. L. PREO.
MACHINE FOR BORING AND DRILLING.
APPLICATION FILED MAY 28, 1920.

1,369,656.

Patented Feb. 22, 1921.
7 SHEETS—SHEET 3.

INVENTORS
Isabelle Henne
John L. Preo
BY
ATTORNEY

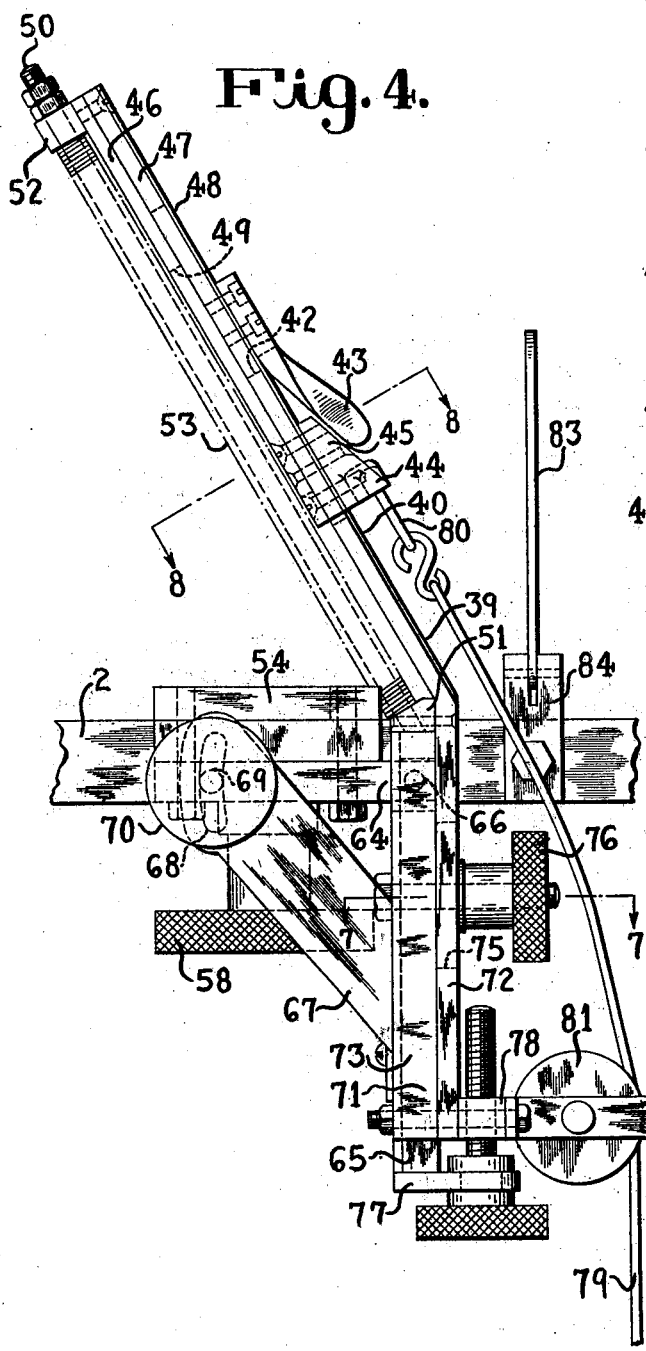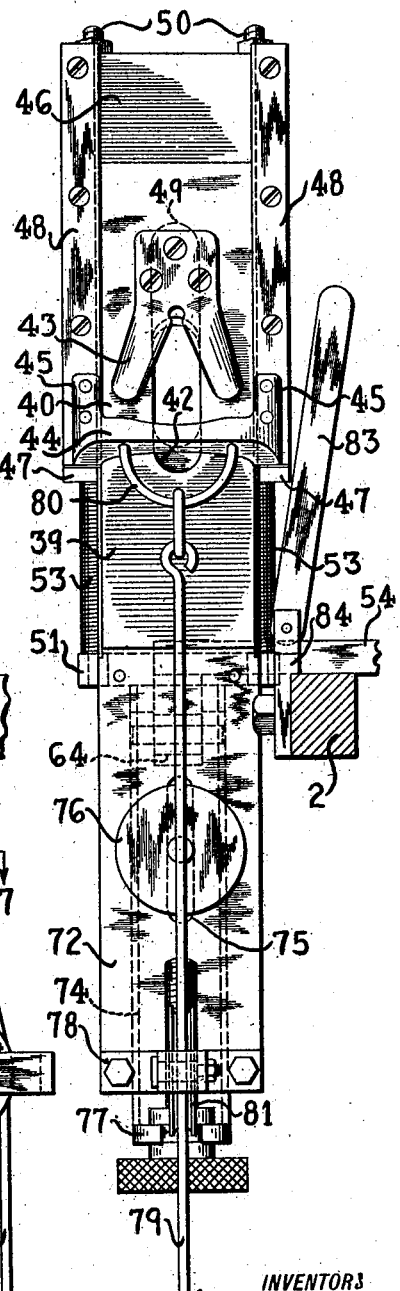

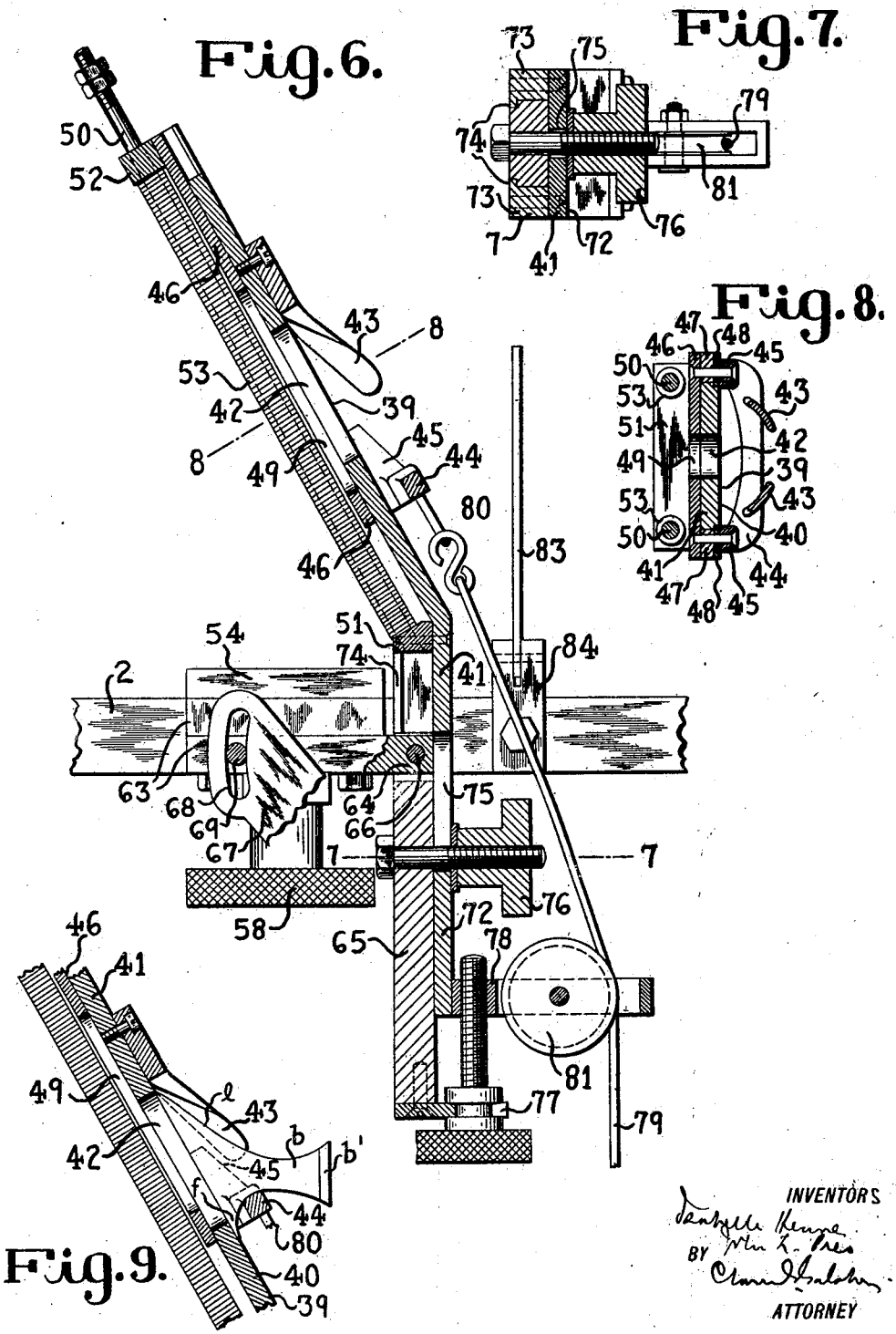

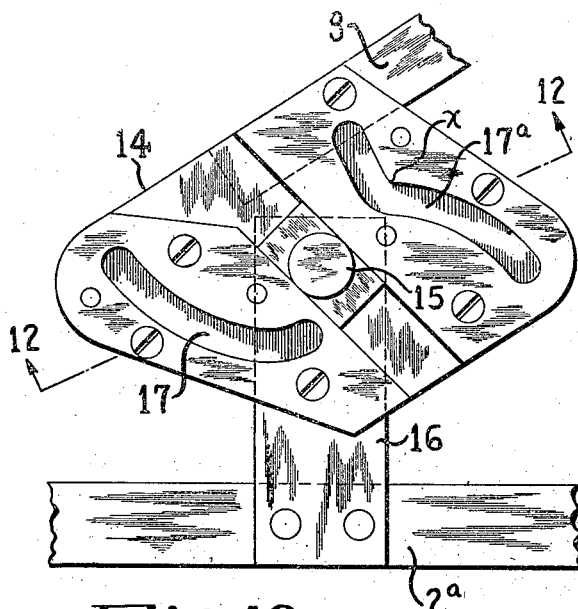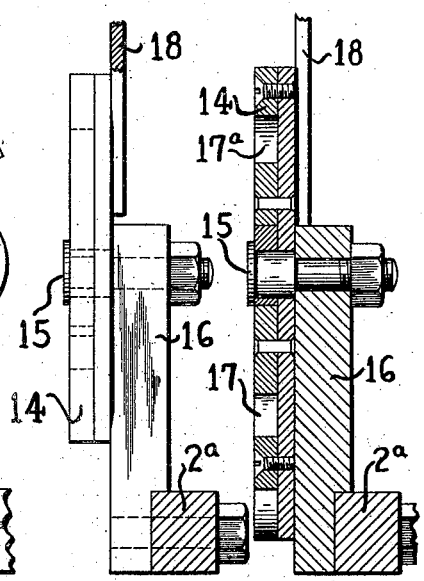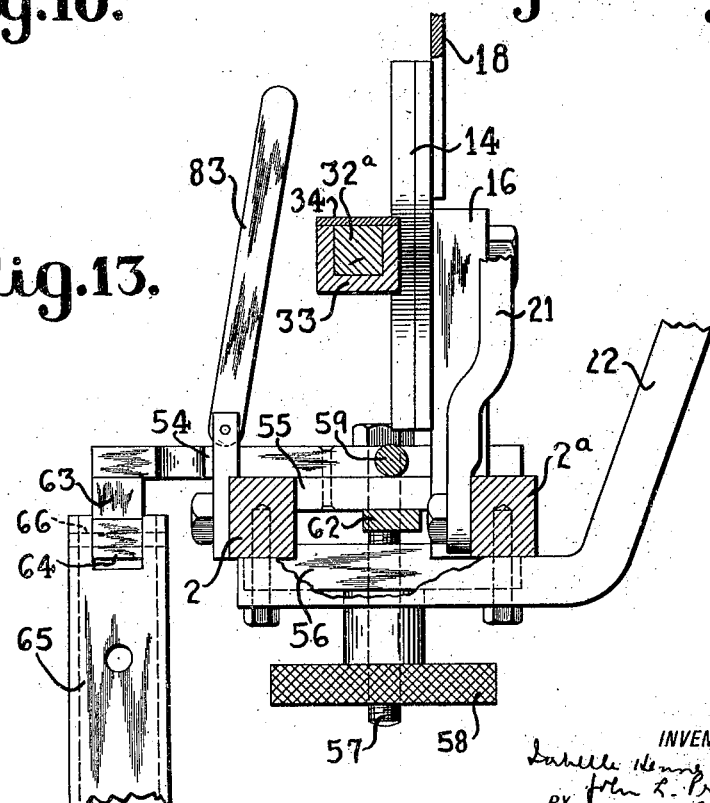

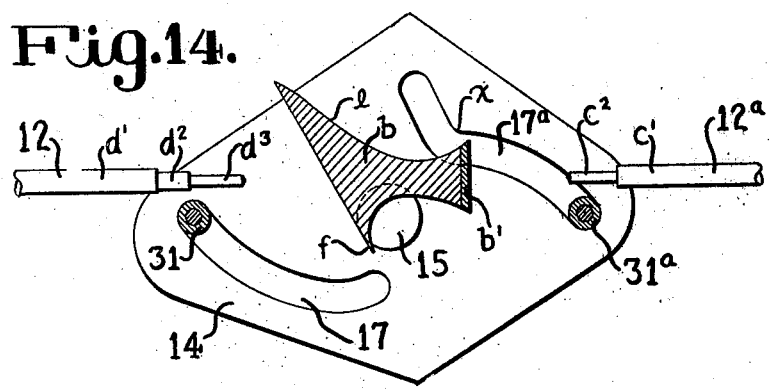
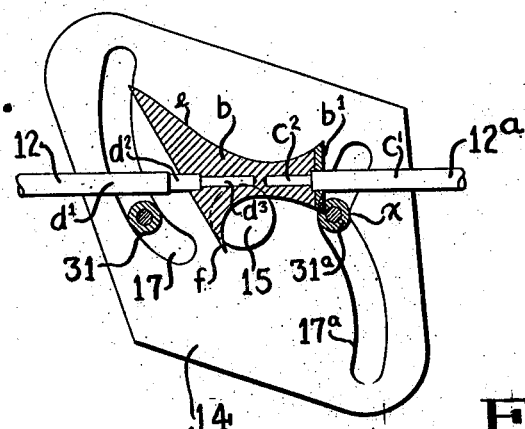
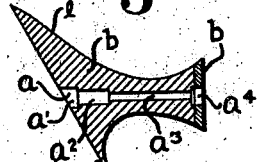
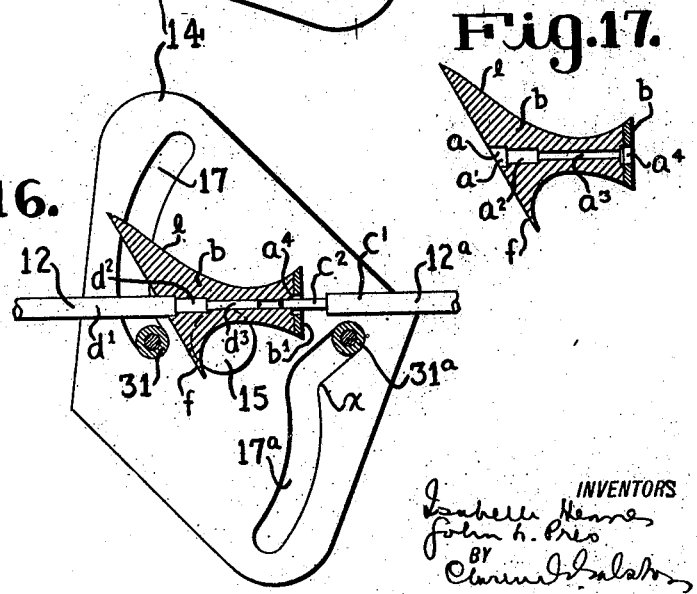

UNITED STATES PATENT OFFICE.

ISABELLE HENNE AND JOHN L. PREO, OF NEW YORK, N. Y.

MACHINE FOR BORING AND DRILLING.

1,369,656.  Specification of Letters Patent.  Patented Feb. 22, 1921.

Application filed May 28, 1920. Serial No. 384,835.

*To all whom it may concern:*

Be it known that we, ISABELLE HENNE and JOHN L. PREO, citizens of the United States, residing in the city and State of New York, have jointly invented Machines for Boring and Drilling, of which the following is a specification.

The invention comprises improvements in boring and drilling machinery, and the particular object is to provide an advantageous machine for drilling wooden French heels with through-extending axial fastener holes, which are counterbored from both ends so as to present a plurality of diameters, in a single operation. The invention accordingly comprises the novel machine, parts, improvements and combinations hereinafter described in the preferred embodiment and more particularly pointed out in the claims.

The views of the drawings forming a part hereof will first be briefly described:

Fig. 4 is a fragmentary front elevation showing the heel-holder and its supports on a larger scale than in Fig. 1;

Fig. 5 is a side sectional elevation corresponding to Fig. 4;

Fig. 6 is a view similar to Fig. 4, but with parts in vertical section and broken away and showing the jaws of the heel-holder open;

Fig. 7 is a horizontal section on the line 7—7 of Fig. 6;

Fig. 8 is a transverse section on the line 8—8 of Fig. 6;

Fig. 9 is a fragmentary sectional view corresponding to Fig. 6, but showing the jaws closed upon a heel;

Fig. 10 is a large front elevation of the cam;

Fig. 11 is an end view thereof;

Fig. 12 is a section through the cam on the line 12—12 of Fig. 10, the support being shown in vertical section for convenience;

Fig. 13 is an enlarged vertical cross-section on the line 13—13 of Fig. 1;

Figs. 14 to 16 are schematic views illustrating stages of the operation; and

Fig. 17 is a sectional view of a heel showing the hole.

Figure 1:
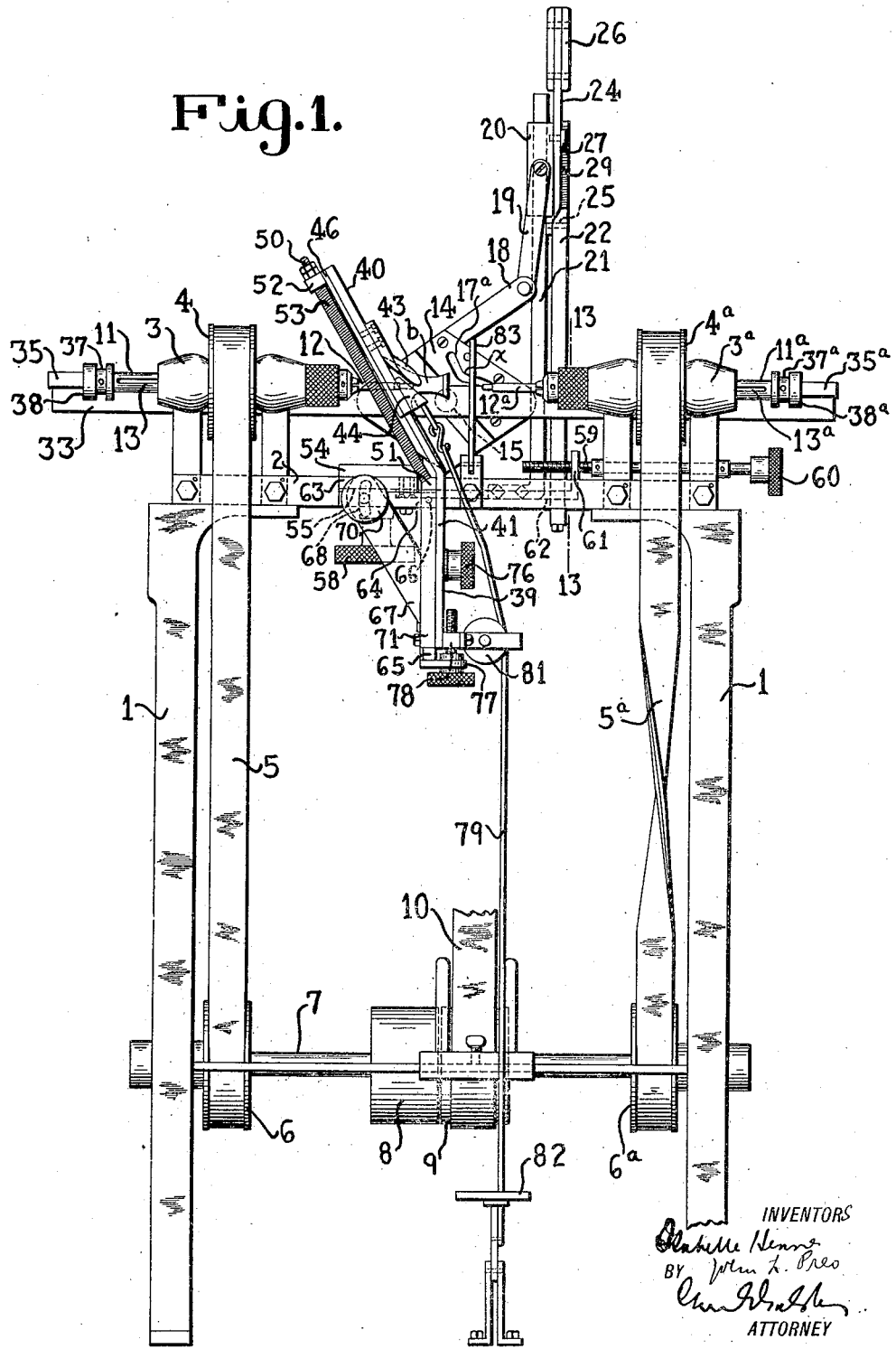
Figure 1 is a front elevation of the machine, a heel being shown in the heel-holder. In this view the heel-holder is shown shifted to the left farther than it would be in actual operation in order that the cam may be seen more clearly.

The frame of the machine, as preferably constructed, comprises two upright end frames 1 joined at the top by horizontally spaced cross-rails 2, $2^a$. Two drill-stocks 3, $3^a$ are mounted upon the top of the frame thus constituted, adjacent the opposite ends thereof, each drill head having a driving pulley 4, $4^a$ driven by a belt 5, $5^a$ from pulleys 6, $6^a$ on a driving shaft 7 journaled in the lower part of the frame, said shaft 7 bearing fast and loose pulleys 8, 9 to receive an external driving belt 10. One of the belts $5^a$ is crossed, as shown, so that the drill spindles 11, $11^a$ are driven in opposite directions, the drills 12, $12^a$ being opposed. Said spindles are supported by their drill-stocks in horizontal axial alinement above and forwardly of the top of the frame, and are slidable through their driving pulleys, with which they have keyed driving engagement, as indicated by the grooves 13, $13^a$.

The machine is more particularly designed for drilling holes $a$ in a general axial position through wooden French heels $b$ (Figs. 14 to 17), such holes being of a number of different diameters $a^1$, $a^2$, $a^3$, $a^4$ at different regions, for the reception of fasteners of a special kind for securing the heels to the shoes and the top-lifts to the heels. Each of these holes, it will be seen, requires to be counterbored a short distance from the top-lift end and doubly counterbored from the heel-seat or cup end. To perform this work the drills 12, $12^a$ are shouldered, the reduction in diameter being from rear to front in each drill; and for the particular purpose in view the drill $12^a$ has two differential working portions $c^1$, $c^2$, and the drill 12 three such portions $d^1$, $d^2$, $d^3$, the end portions $c^2$ and $d^3$ being of equal size.

Means are provided whereby the drills are simultaneously moved or fed longitudinally inward, toward each other, while being driven rotationally, until their ends are in proximity within the heel, and finally moved in the same direction to complete the hole, that is to say, one of the drills, for example the drill $12^a$, is backed off while the other drill continues its forward feed movement. The drill $12^a$ is retracted at a point in its forward movement corresponding to the desired depth of the counterbore $a^4$, and the continued feeding movement of the drill 12 is stopped at the point corresponding to the desired depth of the counterbores $a^1$ and $a^2$, at which time its forward end has removed the remaining core of material in the intermediate bore $a^3$, which is formed by the two drills jointly.

In the preferred embodiment said means comprises a double cam 14 (Figs. 1 and 10–12) disposed in a vertical position, centrally behind and parallel with the axis of the double drilling means, being pivoted on a horizontal axis transverse to the drilling axis on a pin 15 carried by a post 16 rising from the rear rail $2^a$. This cam has two grooves or cam portions 17 and $17^a$, of which the groove 17 approaches the center from its outer to its inner end, while the groove $17^a$ approaches the center from its outer end up to a point $x$ and then recedes therefrom. The cam may be built up, as shown, of a body plate with a number of face pieces secured to it, or in one piece, by any suitable mode of manufacture. A bar 18 united to the cam and projecting laterally and upward forms a crank-arm, to which is pivoted the lower end of a link 19, the upper end of which is pivoted to a cross-head 20, slidable vertically on an upright 21, which is fixed at its lower end to the rail $2^a$. Another frame member 22 secured at its lower portion to the under sides of the rails and thence extending upward and somewhat rearward, and a tie bar 23 uniting the upper ends of the members 21 and 22, complete a fixed superstructure, on the rear member of which an operating hand lever 24 is pivoted at 25. From this fulcrum said lever extends forward and normally somewhat upward, terminating over the drilling means in a handle grip 26, and intermediate its ends has operative connection with the cross-head 20 by means of a pin 27 thereon working in a slot 28 of the lever. A spring 29 serves to raise the lever, so as to restore the same and thereby the train of operating connections and the cam to normal position, after the lever has been pulled downward and released. Or, in absence of such spring, the lever and connected parts can be moved in both directions by hand, and a spring catch 30 can be arranged to hold them in the normal condition.

Figure 3:
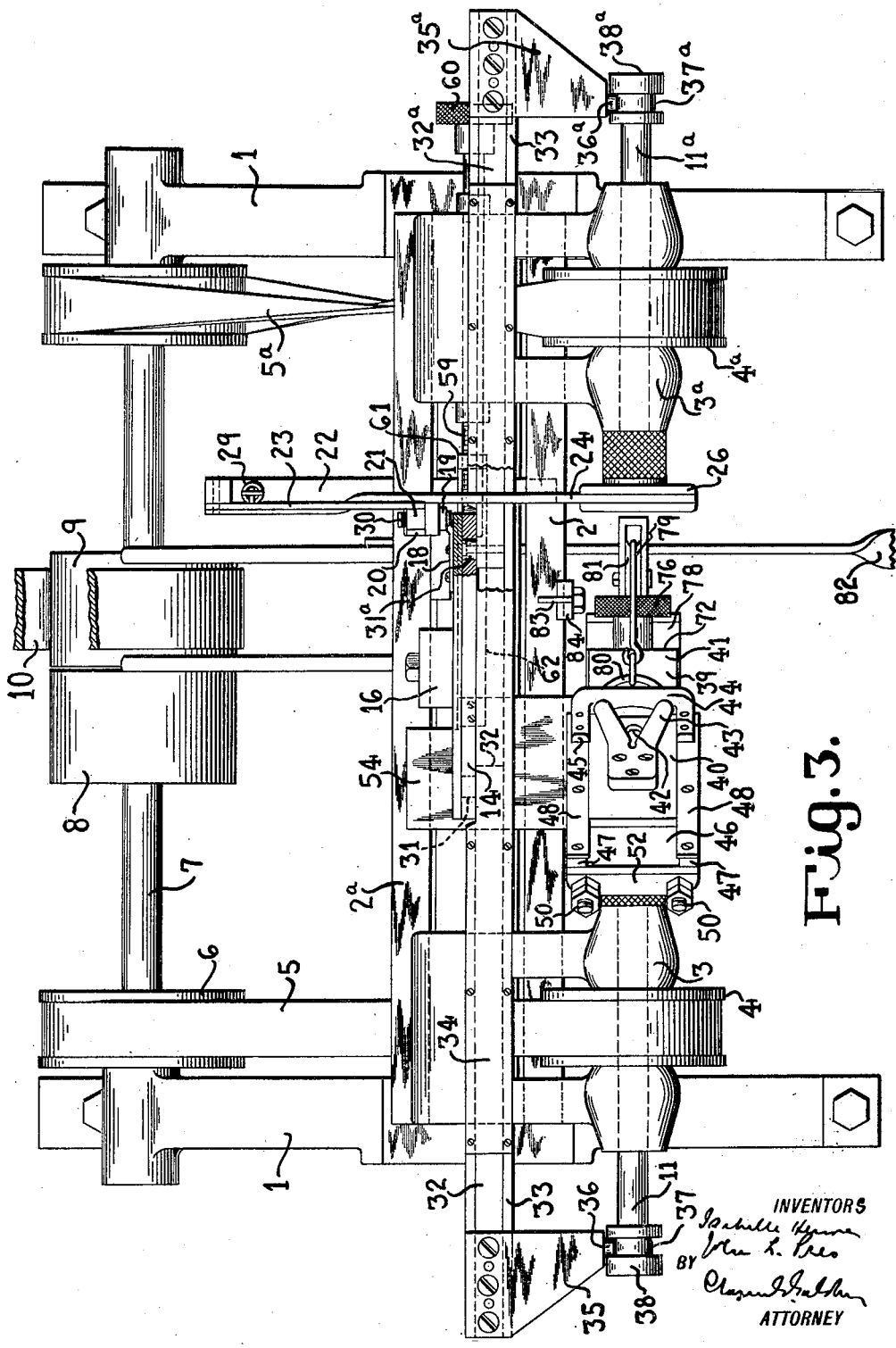
Fig. 3 is a plan view on a larger scale, with a portion broken away and in section.

The grooves 17, $17^a$ of the cam coact with cam rolls or followers 31, $31^a$ on the inner portions of horizontal bars 32, $32^a$, which are connected at their outer portions with the outer portions of the spindles 11, $11^a$, the bars being in rear of the spindles and parallel therewith. A horizontal channel 33 fixed to the brackets of the drill stocks 3, $3^a$, and having a cover plate 34, forms a guide and support for said bars. The rear wall of this guide is omitted at the middle, opposite the cam (see Fig. 3) to permit the coöperation of the cam and followers, and the cover is omitted at the end regions, where forwardly projecting plate arms 35, $35^a$ are screwed to the respective bars. On the forward ends of these arms are pins or rolls 36, $36^a$, which occupy circular grooves 37, $37^a$ on heads 38, $38^a$ fixed to the outer ends of the drill spindles.

The relations are such that the cam followers 31, $31^a$ are normally in the outer end portions of the cam grooves 17, $17^a$, and when the hand lever 24 is depressed the cam is rocked or oscillated so as to cause the cam grooves to move both followers inward toward the center, thereby moving the bars 32, $32^a$ and the drill spindles correspondingly, up to the point where the region $x$ of the groove $17^a$ encounters the follower $31^a$, after which this follower and therefore the spindle $11^a$ move outward, while the follower 31 and spindle 11 continue to move inward. Thus toward the last the two spindles move in the same direction. The ultimate effect of the reverse or restoring operation of the cam and its connections is to move the drills away from each other.

The heel $b$ to be drilled is held fixedly by a heel-holder, designated generally 39, which is supported rigidly and adjustably between the drills of the opposed drilling means. The heel-holder is inclined at a definite angle in the vertical axial plane of the drills, the angle being such that when the broad top or cup of the heel $b$ is applied to the region 40 of the upper face of the holder, constituting a seat, with the back of the heel uppermost, the line through the heel from the cup, through the neck to the top-lift or tread end, where the axis of the bore should lie for proper coöperation with the fastener, is parallel or in alinement with the drilling axis. This angle can be varied slightly for different heels, in the manner presently to be described. The body of the heel may be of wood or other suitable material, and it will usually be provided at the time of drilling with a leather top lift $b^1$.

The heel-holder preferably comprises an inclined plate or table 41, the central upper region of which forms the seat 40 to receive the cup of the heel, said region being formed with a slot 42 disposed lengthwise of the axis of inclination, to accommodate the drill 12. The holder also includes relatively movable jaws 43, 44 adapted to grip the heel and automatically to center it widthwise. The upper jaw 43 is a fork, fixed at its basal portion to the table, and the fingers of which are at an acute angle to each other and to the seat 40, over which they project in a downward direction. The fingers of the fork are reversely inclined or arched in cross-section, as seen in Fig. 8, in such manner as to bear effectively upon laterally spaced regions of the rear swell *e* of different specific sizes and contours of heels. The lower jaw 44 is slidable up and down parallel with the inclination of the seat and may be described as a stirrup, being adapted to bear against the front of the heel and to accommodate the forwardly projecting shank *f* of the cup beneath it. As illustrated, the stirrup is in the general form of a transverse bar, slightly in-bowed in its forward bearing face, spaced or arched away from the plate, and united at its ends with abutments 45, which are riveted to the margins of a slide 46. Said slide may be formed, as shown more particularly in Figs. 6 and 8, of a back plate, designated by the number 46, against the under face of the table plate 41, side bearing strips 47 sliding upon the side edges of said plate and retaining strips 48 overlapping the front of the plate, all being united together by the rivets which secure the stirrup to the slide. The back plate 46 also has a longitudinal slot, marked 49, to permit the passage of the drill 12. A pair of rods 50 are fixed at their lower ends to a piece 51, which is united with the table plate 41, and extend upward behind both plates, through holes in a back piece 52 secured to the upper portion of the sliding plate 46. Strong springs 53 encircling these rods, under compression between the fixed and movable end pieces 51, 52, urge the slide and therefore the stirrup 44 upward, so as to exert clamping pressure upon the heel. By virtue of this pressure and the nature of the jaws, the heel is both wedged to the seat 40 and centered widthwise between the convergent fingers of the jaw 43. This centering action, it will be understood is transverse to the direction of pressure, that is to say in Fig. 1 the centering action of the jaws may be represented by a line of direction perpendicular to the plane of the paper. Any heel placed in the holder, irrespective of its specific size or contour is thus automatically positioned so that a plane equidistant from its two sides (distinguished from its front and back) coincides with the vertical axial plane of the drilling means. The other adjustments, to space the hole to be made at the proper distances from the front and back of the heel, and to predetermine the proper angular relation between it and the slant of the cup, as also to secure the proper end distances between the heel and the drills so that the shoulders in the hole will come at the desired points, are secured manually, as will now be described. These latter adjustments are made only occasionally, and when made are fixed, and remain fixed as long as one specific run of heels is being operated upon.

The preferred means for supporting and adjusting the heel-holder will now be described. The rails 2, 2ᵃ form a horizontal guide support for a carriage, which is thus movable parallel with the drilling axis, in order to adjust the heel-holder back and forth in the line of the drilling axis. Said carriage is designated generally 54, and may be constituted in the simple manner illustrated more particularly in Fig. 13 of a plate of the same number resting slidably on top of the rails, a block 55 united to the under side thereof and of a width to fit slidably between the rails, and a shouldered plate 56 bearing slidably beneath and against the inner surfaces of the rails. A vertical screw 57 is fixed to the upper part of the carriage and passes downward through a hole in the plate 56, beneath which it bears a thumb-nut 58, tightening of which sets the carriage rigidly at any point in its range of adjustment along the guide. The adjustment is effected by a shaft 59 journaled and held against longitudinal movement in the brackets of the drill stock 3ᵃ, having an operating head 60 at its outer end and its inner portion screw-threaded, to engage a tapped hole in an offset 61 on a tongue 62 which extends longitudinally from the carriage.

Figure 2:
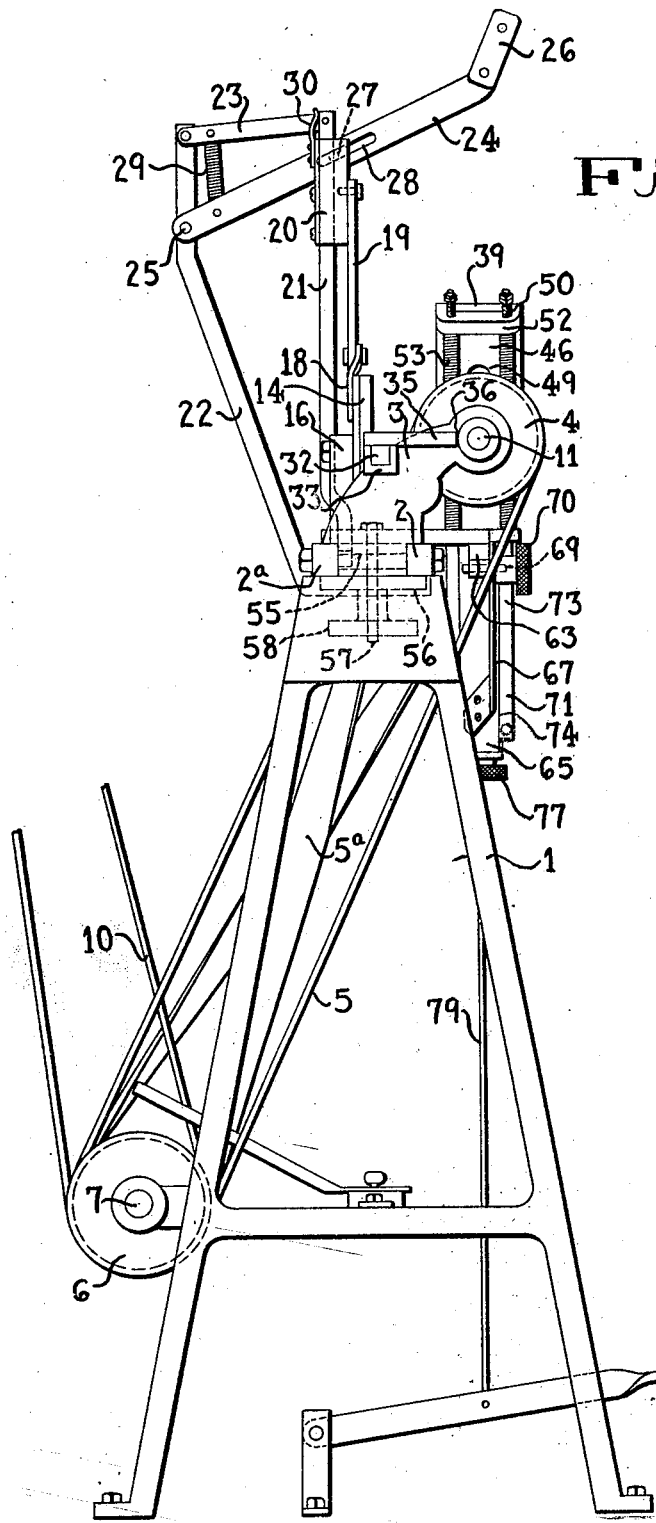
Fig. 2 is an end elevation.

The plate 54 projects forwardly from the rail 2 and has a downwardly projecting flange 63, which may be built up of separate pieces as shown, or may be integral. At one end the lower portion of this flange projects endwise to form a pivot lug 64 (Fig. 6), which has a pivot hole transverse to the line of the guide formed by the rails 2, 2ᵃ. To this lug is pivoted the slotted upper end of a depending, vertical guide bar 65; 66 being the pivot pin which connects these parts together. An arm 67 is secured to the back of this bar (see Fig. 2) and extends so as to bring its other end in juxtaposition to the flange 63, where it has a slot 68 curved in an arc about the pivot 66 as a center, to receive a screw pin 69 projecting from the flange. A thumb-nut 70 on this screw serves to bind the arm to the flange of the primary carriage, and thereby fix the heel-holder at any variation of its inclination.

A sub-carriage 71 bearing the heel-holder is slidable vertically on the secondary guide 65. Said carriage may be constructed as shown of a vertical downward extension 72 of the table plate 41, bearing slidably upon what may be termed the front face of the guide bar 65, and bifurcations 73 extending downward from the piece 51 and united with the extension 72 and therefore with the table. Said bifurcations slidably embrace the edges of the guide bar (Fig. 7), and have rear retaining lips 74. A horizontal screw projecting forward from the bar 65 through a vertical slot 75 in the extension plate 72, together with a thumb-nut 76, constitute means for fixing this carriage at any selected point of vertical adjustment. A vertical operating screw is mounted rotatably and held against longitudinal movement in a bearing 77 on the lower end of the guide 65 and extends upward through a threaded hole in a bracket 78 fixed to the sliding plate 72.

From the foregoing it will be perceived that means are provided for adjusting the heel-holder in the line of the drilling axis, back and forth between the drills, to cause the different zones of the differential hole to be bored to come at the proper points between the cup and toe-lift surfaces of the heel; that other means are provided whereby the heel-holder is adjustable transversely to the line of direction of the foregoing adjustment, to the axis of the drills and to the automatic centering action of the jaws, which has been previously described, and in a plane which contains the axis of the drills, the line of direction of the first adjustment and the axis of inclination of the holder, and finally that still other means are provided whereby the heel-holder is adjustable angularly in a plane which contains the axis of drilling, and the lines of direction of the other two manual adjustments and is perpendicular to the centering action of the jaws.

A wire or cable 79 is connected to an eye 80 on the lower, sliding jaw 44 and passes downward over a pulley 81 in the bracket 78 to a treadle 82. Thus, in a simple manner, operator's power means are provided for opening the jaws of the heel-holder, against the resistance of the closing springs.

A forwardly and rearwardly swinging gage arm 83 pivoted in a block 84 attached to the rail 2 facilitates the establishment of the proper longitudinal relation between the heel and drills.

The operation has been largely explained with the description of structure, but will be briefly summarized. The several manual adjustments of the heel-holder are set for the particular size and form of heel to be operated upon. The operator then depresses the treadle 82, thereby drawing down the jaw 44, and inserts a heel, back up, with its rear swell beneath and in the embrace of the forked jaw 43. When now he removes the pressure of his foot from the treadle, the springs 53 force the stirrup jaw 44 upward, automatically clamping the heel to the seat portion of the holder and centering it. Next the operator grasps the handle 26 and pulls down, thereby causing the rotating drills to approach each other, so as to enter the heel from opposite ends. Before their ends touch, however, the cam 14 causes the drill 12ᵃ to retreat, while the drill 12 continues to advance, with the results which have been previously indicated. At the completion of the hole, the operator permits the hand lever 24 to rise under the action of the spring 29, thereby causing the drills to separate and withdraw entirely from the heel. Foot pressure is again applied to the treadle; the bored heel is taken out, and a fresh one is inserted into the holder.

While the preferred embodiment of the machine has been described in detail, it will be understood that numerous changes in form, proportions and arrangement may be made without departing from the scope of the invention.

What is claimed as new is:

1. A machine for drilling wooden heels with fastener holes counterbored from both ends in a single operation, comprising opposed drilling means, a heel-holder supported between the drills having an inclined heel-seat open to permit the passage of the drilling means and relatively movable jaws adapted automatically to center the heels widthwise with respect to the drilling axis, means for adjustment of the heel-holder back and forth between the drills parallel with the drilling axis, another means for adjustment of the heel-holder transversely to the axis of the drills and to the centering action of said jaws, and means for adjustment of the heel-holder angularly in a plane containing the drilling axis and the line of direction of the last adjustment and perpendicular to the centering action of the jaws.

2. A machine for drilling wooden heels with fastener holes counterbored from both ends in a single operation, comprising a frame, opposed horizontal drilling means thereon, a heel-holder between the drills inclined vertically and longitudinally to the drilling axis, said heel-holder having a seat for the cup of the heel, open for the passage of the drilling means, and relatively movable jaws adapted automatically to center the heels widthwise in a horizontal sense transverse to the axis of drilling, and supporting and adjusting mechanism for the heel-holder comprising parts displaceable, respectively, in a horizontal sense parallel with the drilling axis, up and down transversely to said axis, and angularly in the vertical plane of said axis.

3. A machine for drilling wooden heels with fastener holes counterbored from both ends in a single operation, comprising a frame bearing a horizontal guide support, opposed horizontal drilling means on the frame parallel with said guide support, a carriage adjustable along said guide support, a vertical guide pivoted upon said carriage to tilt in a vertical longitudinal plane with respect to the axis of the drills, and a sub-carriage adjustable along said vertical guide and bearing an inclined heel-holder.

4. A machine for drilling wooden heels with fastener holes counterbored from both ends in a single operation, comprising a frame bearing a horizontal guide support, opposed horizontal drilling means on the frame parallel with and above said guide support, a carriage adjustable along said guide support, a downwardly-projecting guide on said carriage, a sub-carriage adjustable up and down on said downwardly-projecting guide, an inclined heel-holder on said sub-carriage between the drilling means, and means whereby the heel-holder is adjustable as to its inclination.

5. A drilling machine, comprising a frame, opposed horizontal drilling means therein having longitudinally movable spindles, interposed double cam means for moving said spindles toward each other and finally in the same direction to complete the hole, a superstructure rising from the frame, and an operating handle on said superstructure with connections to the cam.

6. A drilling machine, comprising a frame, opposed horizontal drilling means thereon having longitudinally movable spindles, cam-follower bars connected to the outer parts of the spindles and extending inward behind the same, a vertical oscillatory cam pivotally mounted on the frame and having portions coacting with the cam-followers on the bars so as to cause the spindles to move toward each other and finally in the same direction to complete the hole, a superstructure on the frame, an operating lever on the superstructure, and connections between said lever and the cam.

7. In a heel-drilling machine, having drilling means, a heel-holder having a heel-seat portion inclined to the drilling axis, a fork obliquely overhanging said heel-seat portion and adapted to receive the rear swell of the heel, and a stirrup adapted to bear against the front of the heel, one of the two last-mentioned members being movable to open and close the holder.

8. In a heel-drilling machine, having drilling means, a heel-holder having a heel-seat portion inclined to the drilling axis, a fork obliquely overhanging said drill-seat portion and adapted to receive the rear swell of the heel, and a slidable stirrup adapted to bear against the front of the heel.

9. In a heel-drilling machine, having drilling means, a heel-holder comprising a table supported at an inclination to the drilling axis and presenting an inclined slotted heel-seat portion, a fork fixed to the table and projecting obliquely over said portion to receive the rear swell of the heel, a slide on the table, and a member on said slide adapted to bear against the front of the heel and to accommodate the forwardly projecting tongue thereof.

10. In a drilling machine, and in combination with drilling means, a heel-holder for French heels having a seat for the cup of the heel disposed at an inclination to the drill, a fork member oblique to the seat to embrace the rear swell of the heel so as to center the same and wedge it to the seat, and a member to bear upon the front of the heel, said members being relatively movable, clamping spring means for closing said members, and operator's power means for opening them.

11. In a machine for drilling French heels, a heel-holder comprising an inclined table presenting a seat for the cup of the heel, a fork fixed to the table projecting obliquely over the seat to embrace the rear swell of the heel so as to center the same and wedge it against the seat, a slide on the table bearing a stirrup to bear against the front of the heel, clamping spring means acting on the slide, and operator's power means connected to the slide for depressing the same.

12. The herein-described heel-holder comprising a seat for the cup of the heel, a fork oblique to the seat to embrace the rear swell of the heel so as to center the same and wedge it to the seat, and a stirrup to coact with the front of the heel.

13. In a machine for drilling fastener holes in French heels, and in combination with drilling means, a heel-holder comprising a seat for the cup of the heel inclined to the axis of the drilling means, a fork member oblique to the seat to embrace the rear swell of the heel so as to center the same and wedge it to the seat, and a stirrup member coöperative with the front of the heel, said members having relative opening and closing movement in the directions of inclination of the seat, and supporting and adjusting mechanism comprising parts for adjusting the heel-holder, respectively, in the line of the drilling axis, in a line transverse to said line and to the centering action of the jaws, and angularly in a plane containing the drilling axis, the axis of inclination of the holder and said transverse line of adjustment.

ISABELLE HENNE.
JOHN L. PREO.